United States Patent [19]
Kanbayashi et al.

[11] Patent Number: 5,409,530
[45] Date of Patent: Apr. 25, 1995

[54] HOT-MELT INK COMPOSITION

[75] Inventors: Kenichi Kanbayashi; Tohru Fukushima; Fumie Uehara; Makoto Matsuzaki; Toshiaki Ohshima; Shigenori Fukasawa, all of Suwa, Japan

[73] Assignee: Seiko Epson Corporation, Tokyo, Japan

[21] Appl. No.: 84,229

[22] PCT Filed: Nov. 6, 1992

[86] PCT No.: PCT/JP92/01435
§ 371 Date: Oct. 22, 1993
§ 102(e) Date: Oct. 22, 1993

[87] PCT Pub. No.: WO93/09193
PCT Pub. Date: May 13, 1993

[30] Foreign Application Priority Data

| Nov. 6, 1991 | [JP] | Japan | 3-290024 |
| Nov. 6, 1991 | [JP] | Japan | 3-290025 |
| Nov. 6, 1991 | [JP] | Japan | 3-290026 |
| Dec. 5, 1991 | [JP] | Japan | 3-321787 |
| Dec. 26, 1991 | [JP] | Japan | 3-345334 |
| Jan. 9, 1992 | [JP] | Japan | 4-001824 |
| Jan. 27, 1992 | [JP] | Japan | 4-011854 |

[51] Int. Cl.$^6$ .............................................. C09D 11/02
[52] U.S. Cl. ........................... 106/27 A; 106/27 R; 106/30 R; 106/30 A; 106/22 A; 106/23 A
[58] Field of Search ............... 106/20 D, 22 A, 23 A, 106/22 E, 23 E, 27 R, 27 A, 30 R, 30 A

[56] References Cited

U.S. PATENT DOCUMENTS

| 4,484,984 | 11/1984 | Merritt et al. | 106/27 A |
| 4,659,383 | 4/1987 | Lin et al. | 106/27 A |
| 4,684,956 | 8/1987 | Ball | 106/22 A |
| 4,758,276 | 7/1988 | Lin et al. | 106/22 A |
| 4,878,946 | 11/1989 | Tabayashi et al. | 106/27 A |
| 5,000,786 | 3/1991 | Matsuzaki | 106/22 A |
| 5,041,161 | 8/1991 | Cooke et al. | 106/22 A |
| 5,141,559 | 8/1992 | Shinozuka et al. | 106/22 A |
| 5,151,120 | 9/1992 | You et al. | 106/22 E |
| 5,270,730 | 12/1993 | Yaegashi et al. | 106/22 A |

FOREIGN PATENT DOCUMENTS

| 61-83268 | 4/1986 | Japan . |
| 62-295973 | 12/1987 | Japan . |
| 63-205241 | 8/1988 | Japan . |
| 1-242672 | 9/1989 | Japan . |
| 2-167373 | 6/1990 | Japan . |
| 3-91572 | 4/1991 | Japan . |

Primary Examiner—Helene Klemanski
Attorney, Agent, or Firm—Ladas & Parry

[57] ABSTRACT

The present invention disclosed herein provides a hot-melt ink composition that can provide a good fixing strength and a high quality of print independently of the kinds of recording media. The hot-melt ink composition according to the present invention is a hot-melt ink composition that is solid at room temperature and jetted as droplets at a temperature above room temperature and comprises a a coloring material; and a vehicle comprising at least a first component and a second component, wherein said first component, as such, does not dissolve said coloring material, said second component has a higher melting point than said first component; dissolves said coloring material; is compatible with said first component at the melting point of said second component or above; and can dissolve said coloring material and said first component to form a homogeneous phase, and the weight ratio of said first component to said second component is in the range of from 93/7 to 1 and the amount of said coloring material is 2% by weight or more based on the ink composition, provided that, when the weight ratio of said first component to said second component is less than 9, the weight ratio of said coloring material to said second component is 0.3 or more.

18 Claims, 3 Drawing Sheets

HOT-MELT INK COMPOSITION

BACKGROUND OF THE INVENTION

1. Field of the Invention

The present invention relates to an ink composition for use in an ink jet recording device and an ink jet recording method and an ink jet recording device using the same. More particularly, it is concerned with a hot-melt ink composition, which is solid at room temperature and jetted as droplets at a temperature above room temperature, and an ink jet recording method and an ink jet recording device using the same.

2. Background Art

Ink jet recording is excellent in noiselessness during recording and high speed printing. Liquid ink compositions containing water as a base have hitherto been used as an ink composition for ink jet recording. This type of printing, however, had a drawback that a remarkable difference in the quality of prints occurs between the kinds of paper. For this reason, hot-melt ink compositions have been proposed as an ink composition capable of realizing a good quality of print independently of the quality of the paper (U.S. Pat. Nos. 3,653,932, 3,715,219, 4,390,369, 4,484,948 and 4,659,383 and Japanese Patent Laid-Open Nos. 54368/1980, 113462/1981, 113472/1981 and 108271/1983). A recording method using this type of ink comprises heat-melting the ink composition, which is solid at room temperature, at a high temperature, jetting and putting droplets of the melted ink composition on a recording medium, and cooling and solidifying the droplets to form a record dot.

Although the conventional hot-melt ink compositions are excellent in the compatibility with the recording medium and in dryability after printing, they have had several problems. For example, since the record dot solidifies in a mound shape on the recording medium the strength of bonding between the record dot and the recording medium is so low that the record dot is peeled off by the action of external abrasion, heat, pressure and the like, that is, the conventional hot-melt ink compositions have poor abrasion resistance. Furthermore, it has been pointed out that, when the print is allowed to stand at a high temperature, it unfavorably sticks to a material put on the print (blocking) or blurs.

In order to avoid the problems, several methods have been proposed for successfully fixing the record dot to the recording medium by taking advantage of heat or pressure (U.S. Pat. No. 4,745,420 and Japanese Patent Laid-Open No. 205241/1988). In these methods, however, when the conventional hot-melt ink composition is employed, the ink composition unfavorably penetrates and diffuses into the recording medium during remelting, which often gave rise to blurring of the print. Furthermore, it has been pointed out that the provision of a fixing mechanism makes the recording device complicated. In addition, the fixation time is rate-limiting for the process, so that it becomes impossible to make the best use of the quick drying property that is the advantage of the hot-melt ink composition.

The present inventors have proposed hot-melt ink compositions described in U.S. Pat. No. 5,000,786, Japanese Patent Laid-Open No. 277910/1988 and European Patent No. 0315406. The present invention provides a hot-melt ink composition improved over these hot-melt ink compositions.

SUMMARY OF THE INVENTION

Accordingly, an object of the present invention is to provide a hot-melt ink composition that can provide a good fixing strength and a high quality of print independently of the kinds of recording media.

Another object of the present invention is to provide a hot-melt ink composition that can be fixed by using a simple fixing mechanism.

A further object of the present invention is to provide a hot-melt ink composition that is free from blurring of print even when it is subjected to fixing, and enables a good quality of print to be reproduced in a short fixing time.

A further object of the present invention is to provide an ink jet recording method that enables a good fixing strength and a high quality of print to be provided independently of the kinds of recording media.

A further object of the present invention is to provide an ink jet recording method using the hot-melt ink composition and an ink jet recording device suitable for practicing said ink jet recording method.

The hot-melt ink composition according to the present invention comprises:

a coloring material; and a vehicle comprising at least a first component and a second component, wherein said first component, by itself, does not dissolve said coloring material, said second component has a higher melting point than said first component; dissolves said coloring material; is compatible with said first component at the melting point of said second component or above; and can dissolve said coloring material and said first component to form a homogeneous phase, and the weight ratio of said first component to said second component is in the range of from 93/7 to 1 and the amount of said coloring material is 2% by weight or more based on the ink composition, provided that, when the weight ratio of said first component to said second component is less than 9, the weight ratio of said coloring material to said second component is 0.3 or more.

The second hot-melt ink composition according to the present invention comprises:

a coloring material;

a vehicle comprising at least a first component and a second component; and a resin, wherein said first component, as such, does not dissolve said coloring material, said second component has a higher melting point than said first component, dissolves said coloring material, is compatible with said first component at the melting point of said second component or above and can dissolve said coloring material and said first component to form a homogeneous phase, and said resin is compatible with either one or both of said first component and said second component.

The ink jet recording method according to the present invention comprises the steps of:

feeding the above-described hot-melt ink composition;

heating said hot-melt ink composition at a temperature above the melting point of said second component;

jetting the heated hot-melt ink composition as droplets on a recording medium;

solidifying the ink droplets on said recording medium; and heating said recording medium at a temperature between temperatures at which the hot-melt ink composition has two major endothermic peaks as obtained by differential scanning calorimetry, thereby to cause only said first component to selectively melt-penetrate into the recording medium while leaving said second component and said coloring material on the recording medium.

The ink jet recording device according to a further aspect of the present invention is an ink jet recording device wherein an ink composition, which is solid at room temperature, is jetted as droplets at a temperature above room temperature on a recording medium to effect recording, said ink jet recording device comprising:

heating means for heating an ink composition comprising two vehicle components having different melting points to a temperature above room temperature to bring the ink composition into a melted state;

recording means for jetting the ink composition in the melted state through an ink jetting port to form a dot image on said recording medium;

a cooling area provided in the vicinity of the surface of the recording medium so as to face said recording means for cooling the recording medium having a dot image formed thereon to room temperature or below;

carrying means for carrying the cooled recording medium; and heat-fixing means provided downstream of the cooling area in the direction of carrying the recording medium and capable of heating the recording medium at a temperature between temperatures at which the hot-melt ink composition has two major endothermic peaks as obtained by differential scanning calorimetry.

BRIEF DESCRIPTION OF THE DRAWINGS

FIGS. 2(a), (b) and (c) are schematic views of a mechanism for fixing the hot-melt ink composition according to the present invention;

DETAILED DESCRIPTION OF THE INVENTION

Figure 1:
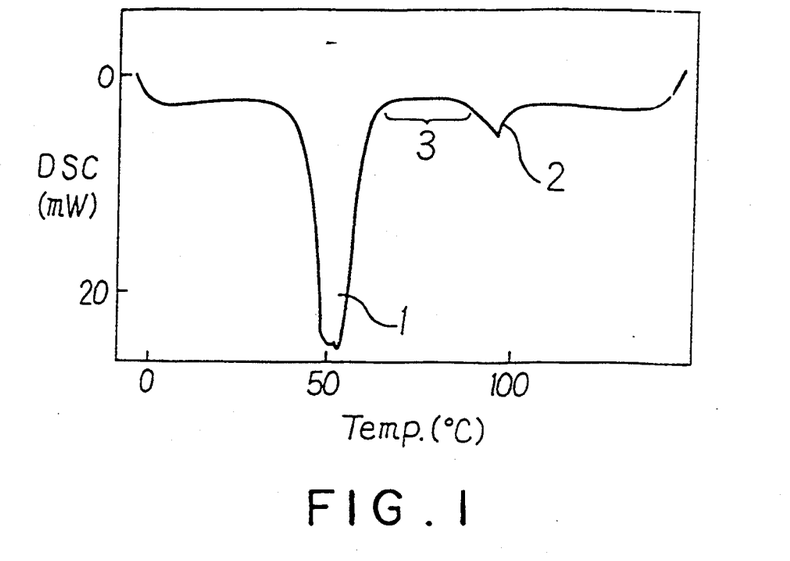
FIG. 1 is an example of a DSC (differential scanning calorimetry) chart of the hot-melt ink composition according to the present invention.

The ink composition according to the present invention basically comprises a coloring material and at least two vehicles different from each other in the melting point. A chart showing the results of differential scanning calorimetry (DSC) of an embodiment of the hot-melt ink composition according to the present invention is shown in FIG. 1. As is apparent from this chart, the ink composition according to the present invention exhibits by differential scanning calorimetry two major endothermic peaks, that is, a first endothermic peak 1 and a second endothermic peak 2 at a temperature above the temperature 1. According to a preferred embodiment of the present invention, the temperature difference is 10° C. or more. The two endothermic peaks of the ink composition according to the present invention are attributable to the at least two vehicles different from each other in the melting point contained in the ink composition according to the present invention. The first component, as such, should not dissolve the coloring material. The second component should have a higher melting point than the first component, dissolve the coloring material, have a compatibility with the first component at the melting point of the second component or above and be able to dissolve the coloring material and the first component to form a homogeneous phase.

Figures 2A, 2B, 2C:
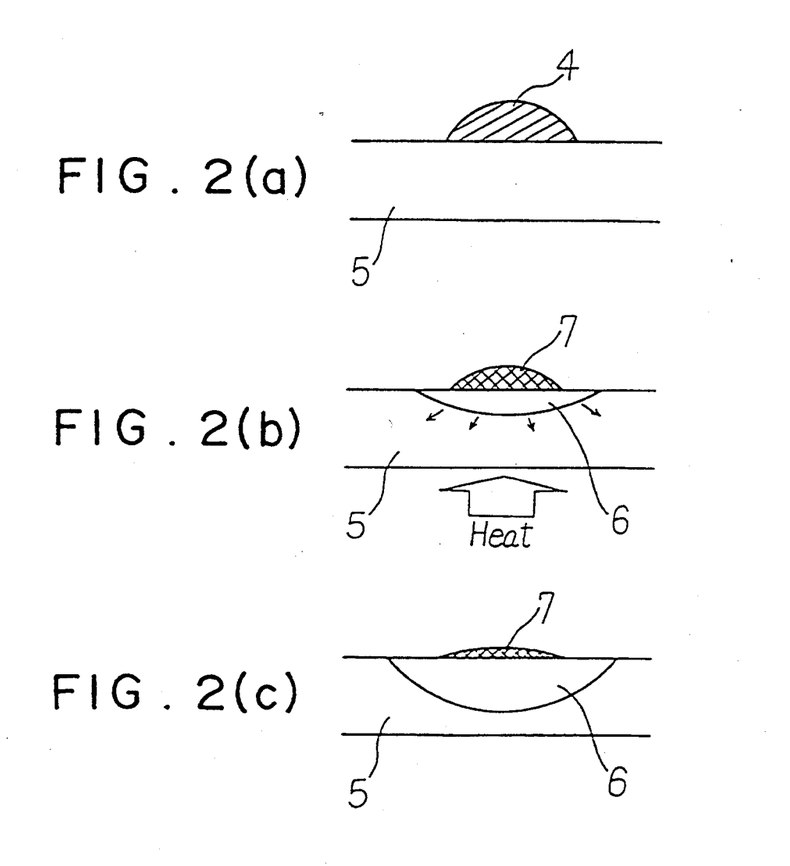

The recording method using the ink composition according to the present invention will now be described with reference to FIG. 2. At the outset, the ink composition according to the present invention is jetted as droplets at a temperature above room temperature to form a dot image on a recording medium. FIG. 2 (a) is a schematic diagram showing the state of a record dot on the recording medium. As is apparent from this diagram, the record dot 4 generally solidifies in a mound shape on the recording medium 5. The recorded medium on which a record dot has been formed is then heated in a non-endothermic temperature region between an endothermic peak 1 and an endothermic peak 2 (in the present specification, this heating operation is often referred to as "fixing operation" or simply as "fixation", and the heating time is often referred to as "fixing time").

This heating operation causes the first component in the record dot to melt and penetrate into the recording medium 5. FIG. 2 (b) is a schematic diagram showing the state of penetration of the first component into the recording medium 5 by the heating. In this connection, since the first component, as such, does not dissolve the coloring material, the record dot comprising the second component and the coloring material remains in the solid state on the recording medium 5, while the first component penetrates into a region 6 as shown in the recording medium 5. In this case, the record dot is gradually flattened and becomes a substantially flat record dot 7.

FIG. 2 (c) is a schematic diagram showing the state of a record dot which has been cooled following removal of heat at a temperature 3. The record dot 7 is in a flattened state, and, by virtue of the flat configuration, an improvement in the rubbing resistance over that of the record dot 4 having the mound shape as shown in FIG. 2 (a) is expected. Furthermore, the region 6 where the first component penetrated into the recording medium 5 has been solidified serves also as a fixing agent for fixing the record dot 7 to the recording medium 5. In this respect as well, an improvement in the rubbing resistance of the print is expected.

In the hot-melt ink composition fixed by the above mechanism, there is a possibility that, when the first component penetrates into the recording medium, the second component is drawn by the penetration of the first component, which gives rise to blurring of the record dot. Such blurring of the record dot unfavorably changes the initial dot diameter of the record dot. For this reason, in order to reproduce a good dot, the occurrence of blurring should be inhibited. According to the hot-melt ink composition according to the present invention, the occurrence of blurring during fixation can be remarkably inhibited when the weight ratio of the first component to the second component is in the range of from 93/7 to 1 and the weight ratio of the coloring material to the ink composition is 0.02 or more. Furthermore, if the weight ratio of the first component to the second component is less than 9, the occurrence of blurring during fixation can be remarkably inhibited when the weight ratio of the coloring material to the second component is 0.3 to more.

In this case, even when the weight ratio of the first component to the second component is 9 or more, if the weight ratio of the coloring material to the second component is 0.3 or more, the occurrence of blurring during fixation can be inhibited. In addition print having a good rubbing resistance can be provided even in the case where the fixing time is short (preferably as short as less than 5 sec). On the other hand, it is preferred to avoid the weight ratio of the coloring material to the second component which exceeds 0.45. This is because, although properties such as quality of print remain good, in some case, the service life of the ink (defined as a time taken for unfavorable phenomena, such as occurrence of precipitates, disappearance of compatibility of ink (occurrence of layer separation) and a change in properties of the ink, to occur and to hinder ink jet recording) often becomes short.

When the weight ratio of the first component to the second component is particularly in the range of from 93/7 to 90/10, it is possible to significantly improve the rubbing resistance of print. This is because it has been found that the rubbing resistance is further improved when the weight ratio of the record dot on the recording medium after the fixation operation to the record dot before the fixing operation is in the range of 7 to 10% (hereinafter the ratio is referred to as "residual amount" which substantially corresponds to the content of the second component in the ink composition because the record dot after the fixing operation consists essentially of the second component). For example, when the resolution of print is 300 dpi (number of dots per inch), a dot diameter of 130 $\mu$m per dot is necessary. In the ink composition according to the present invention, in order to obtain this dot diameter, the amount of jetted ink for the dot should be in the range of from 0.12 to 0.16 $\mu$g. In this case, when the residual amount of the second component per dot is 0.012 $\mu$g or less, a remarkable improvement in the rubbing resistance can be attained. When the resolution of print is 600 dpi, if the residual amount is 0.005 $\mu$g or less, the rubbing resistance can be significantly improved. When the resolution of print is 600 dpi, a dot diameter of 60 $\mu$m per dot is necessary. For this purpose, the amount of jetted ink for the dot should be preferably about 0.05 $\mu$g.

The difference in the melting point between the first component and the second component is preferably 10° C. or more, still preferably 20° C. or more. When the temperature difference is less than 10° C., the non-endothermic temperature region between two major endothermic peaks as obtained by DSC becomes so narrow that the fixing temperature should be strictly regulated.

The first component is preferably a nonpolar material, and the second component is preferably a material having a polar moiety and a nonpolar moiety.

Preferred examples of the first component include natural wax such as petroleum wax and vegetable wax. Specific preferred examples of the natural wax include carnauba wax, candelilla wax, hydrogenated jojoba oil, paraffin (preferably n-paraffin and iso-paraffin having 23 to 32 carbon atoms) and microcrystalline wax. Further, it is also possible to use commercially available wax, for example, No. 115, 120, 125, 130, 135, 140, 150, 155, HNP-3, 9, 10, 11, 16, SP-0145, 1035, 3040, 3035, 0110 (all the above-described products being available from Nippon Seiro Co., Ltd.) and microcrystalline wax, for example, Hi-Mic-2045 and 1045 and CARTOWAX-3025, 3735 and 3640 (these products being available from Nippon Seiro Co., Ltd.)

Preferred examples of the second component include fatty acids, fatty acid amides and their derivatives. Specific preferred examples thereof include fatty acids, such as behenic acid, stearic acid, palmitic acid, glutaric acid, azelaic acid, and sebacic acid, and their derivatives and fatty acid amides, such as erucic amide, lauric amide, coconut acid amide, stearic amide, palmitic amide, behenic amide, brassidic amide, acetamide, benzamide, propionic amide, oleic amide and ricinoleic amide, and their derivatives. Further, it is also preferred to use commercially available fatty acids or fatty acid amides, and preferred examples thereof include Amide-O, HT-P and C (available from Lion Corp.), Daiamid B90 and K60 and Amide AP-95 (available from Nippon Kasei Chemical Co., Ltd.), and Fatty Acid Amide-S, T, P, C and O (available from Kao Corp.).

The coloring material is preferably a dye and should be soluble in the second component but insoluble in the first component. Furthermore, it is preferably excellent in the water resistance and free from the sublimation by heat, bleeding and migration to a recording medium. Preferred examples of the coloring material includes the following dyes.

Black dyes:
C.I. Solvent Black 3, 57, 27, 29, 34 and 45, Aizen Spilon Black GMH Special and RLH (available from Hodogaya Chemical Co., Ltd.), Savinyl Black RLS (available from Sandoz K.K.), etc.

Yellow dyes:
C.I. Solvent yellow 81, Direct Fast Yellow R special and Yellow 52 (available from Mitsubishi Kasei Corp.), Cathilon Yellow-K-3RLH, GLH and Aizen Spilon Yellow-C-GNH (available from Hodogaya Chemical Co., Ltd.)and VALIFAST YELLOW 3110 (available from Orient Chemical Industries, Ltd.).

Red and magenta dyes:
C.I. Acid Red 52 and 254, Red 63 and Diacryl Red MSN (available from Mitsubishi Kasei Corp.), J.I. Magenta E-10 (available from Taoka Chemical Co., Ltd.) VALIFAST PINK 2310 (available from Orient Chemical Industries, Ltd.), Aizen Spilon Red BEH and Pink BH (available from Hodogaya Chemical Co., Ltd.), Oil Magenta 101 (available from Sumitomo Chemical Co., Ltd.), etc.

Blue and cyan dyes:
C.I. Solvent Blue 25, 38 and 70, Nylosan Blue-E-GL (available form Sandoz K.K.), Oil Blue EX-292 and 293 (available from Mitsui Toatsu Chemical, Inc.) Blue 31 (available from Mitsubishi Kasei Corp.), J.I. Cyanine E-10 (available from Taoka Chemical Co., Ltd.), Kayaset Blue 136 and 906 (available from Nippon Kayaku Co., Ltd.), HC Blue 1 and 1-M and Victoria Pure Blue BOH (available from Hodogaya Chemical Co., Ltd.), Oil Blue 603 (available from Orient Chemical Industries, Ltd.), and S.I. Blue 01E (available from Sumitomo Chemical Co., Ltd.), etc.

It is also possible to use the coloring materials in the form of a mixture of two or more of them.

Furthermore, the temperature at which the first endothermic peak by DSC appears can be lowered by using the first component in the form of a mixed system comprising two or more kinds of the first component. The lowering in the temperature at which the first endothermic peak appears is preferred because the fixing temperature margin becomes wide. The component in the form of the mixed system can unexpectedly contribute to an improvement in the mechanical strength of the ink composition (preferably 1.2 to 2 fold improvement). Thus, an advantageous effect of improving the rubbing resistance of print can also be attained.

The temperature at which the second endothermic peak by DSC appears can be lowered by using the second component in the form of a mixed system comprising two or more kinds of the second component. This can lower the heating temperature at which the ink composition is melted, which is preferred from the viewpoint of preventing the deterioration of the ink composition by heat. Furthermore, it has been confirmed that the second component in the mixed system can contribute to an improvement in the mechanical strength. The improvement in the mechanical strength can advantageously improve the rubbing resistance of print.

The second component in the form of a mixed system preferably comprises two or more fatty acid amides. Furthermore, it is preferred for at least one of the fatty acid amides in the mixed system to be selected from the group consisting of behenic amide, stearic amide and palmitic amide. When the second component in a mixed system comprises two fatty acid amides selected from the above three fatty acid amides, the composition ratio of the two fatty acid amides is preferably in the range of from 10:90 to 90:10, still preferably 25:75 to 75:25.

Without intending to be bound by theory, it is believed that the reason why the ink composition according to the present invention can provide a good quality of print is as follows: Since the coloring material is generally a polar material, it is not dissolved in the first component but can be well dissolved in the second component. The second component can be well dissolved in the first component. Under these conditions, when the coloring material is present in a given amount, the second component molecules pull against each other through the coloring material to increase the cohesive force, so that, during the fixing operation, the second component is fixed without being drawn by the penetration of the first component into the recording medium. The coloring material lowers the compatibility of the first component with the second component and facilitates the separation of the first component from the second component. As a result, this increases the rate of penetration of the first component into the recording medium and can shorten the fixing time.

According to another embodiment of the present invention, there is provided a second hot-melt ink composition comprising the first and second components and further a resin having a compatibility with either or both of the first and second components. This hot-melt ink composition can significantly improve the mechanical strength of the ink composition, so that an excellent rubbing resistance of print can be realized.

Preferred examples of the resin added to the second hot-melt ink composition include resins usually added to hot-melt adhesives and called "tackifier". Specific examples thereof include tackifier resins described in Hiroshi Fukada, "Hotto Meruto Setchakuzai no Jissai (Hot-Melt Bonding in Practice)": Shin-Kobunshi Bunko, Kobunshi Kankokai, 1979, p. 67. Still preferred examples thereof include thermoplastic resins having a softening point of 120° C. or below. Specific examples of such thermoplastic resins include rosins and rosin derivatives for example, Hypale, Super Ester A-75 and Ester Gum AAL, H and HP available from Arakawa Chemical Industries, Ltd.; Pentalyn A-JA and Dymerex Resin available from Rika Hercules Inc.; and the like, terpenes and modified terpenes for example, YS Resin P and YS Resin A (available from Yasuhara Chemical Co., Ltd.); Clearon (available from Arakawa Chemical Industries, Ltd.); and the like, aliphatic petroleum resins for example, Quintone N-180 and B-170 (available from Nippon Zeon Co., Ltd.); Hi-rez HRT 200X (available from Mitsubishi Petrochemical Co., Ltd.); and the like, aromatic petroleum resins for example, Oligotech 1300, 1100 and 1040 (available from Mitsubishi Petrochemical Co., Ltd.); and the like, hydrogenated and copolymer petroleum resins for example, Arkon P-70 and P-90 (available from Arakawa Chemical Industries, Ltd.), and Escorez 5300 (available from Exxon Corp.), cumarone-indene resins (for example, Escuron G90, N100 and V120 (available from Shin-Nittetsu Kagaku Co. Ltd.); and the like, styrene resins for example, Kristalex 3100 and Piccotex A75 (available from Exxon Corp.); and the like, polyamide resins for example, Macromelt 6071 (available from Henkel Hakusui Corp.); Rheomid S2400 and S6800 (available from Kao Corp.); and the like, polyethylene resins for example, FTR6100 (available from Mitsui Petrochemical Industries, Ltd.); and the like, and polyethylene copolymers for example, EEA MB900 (available from Nippon Unicar Co., Ltd.); Tafmer HL0809 (available from Mitsui Polychemicals Co., Ltd.); BASF EVA1 (available from BASF), Bondine AX8060 (available from Sumitomo Chemical Co., Ltd.); and the like.

The amount of these resins is preferably in the range of from 5 to 45% by weight, still preferably in the range of from 10 to 20% by weight based on the ink composition. When the amount of addition of the resin is in the range, the rubbing resistance of print can be significantly improved. In particular, an excellent rubbing resistance of print can be attained when printing is effected on sheets for OHP.

In the second hot-melt ink composition according to the present invention, the amounts of addition of the first component, second component and coloring material is not particularly limited so far as good rubbing resistance of print can be maintained since the rubbing resistance of print could be significantly improved by the addition of the resin. However, they are preferably in the respective ranges described above in connection with the hot-melt ink composition not containing the resin.

The ink composition according to the present invention can be preferably produced as follows. Specifically, the first component, second component and coloring material are heat-melted at the melting point of the second component or above, preferably a temperature about 5° to 15° C. above the melting point of the second component, and sufficiently stirred until a homogeneous composition is provided. The ink composition in a melted state is optionally filtered by a filter to remove solid matter and then cooled, thereby providing the ink composition of the present invention.

Still preferably, a coloring material is first added to the second component as heat-melted. The mixture is sufficiently stirred to dissolve the coloring material in the second component. The first component is then added to the solution. The mixture is sufficiently stirred to provide a homogeneous composition and then filtered by a filter. If the first component and the second component are preferentially heat-melted and mixed with each other, in some cases, the polarity of the polar moiety in the second component is weakened by pull of molecules of the first and second component against each other. This often makes it difficult to dissolve the subsequently added coloring material in the second component.

In the preparation of the second hot-melt ink composition, the resin may be added to the system from the beginning together with the first component, second component and coloring material. Alternatively, it may be added at a point of time when the first component, second component and coloring material have been heat-melted. Furthermore, it is also possible to add the resin after the first component, the second component and the coloring material are brought to a homogeneous composition.

Various properties of the ink composition according to the present invention are preferably regulated so that they are suitable for use in the recording method. For example, the viscosity of the ink composition at a working temperature for printing (preferably at a temperature about 10° to 20° C. above the melting point of the second component) is preferably 15 mPa·s or less because it is possible to stably effect the supply of the ink, formation of ink droplets and jetting of the ink droplets. Furthermore, the surface tension is preferably 50 mN/m or less from the viewpoint of the formation of meniscus in the vicinity of the nozzle. The surface tension is still preferably 35 mN/m or less from the view point of accelerating the penetration of the ink on the recording medium after printing.

The hot-melt ink composition according to the present invention may contain various additives. For example, it is possible to properly add antioxidants for preventing the oxidation by heat and various surfactants for modifying the surface tension.

According to a further aspect of the present invention, there is provided an ink jet recording method using the hot-melt ink composition according to the present invention. In the ink jet recording method according to the present invention, the ink composition is heated at a temperature above the higher endothermic peak temperature between two major endothermic peaks by DSC, preferably at a temperature about 10° to 20° C. above the higher temperature to melt the ink composition which is solid at room temperature. The ink composition in a melted state is then jetted as droplets on a recording medium to form a record dot on the recording medium. The record dot is cooled or allowed to stand at room temperature for solidification.

Subsequently, the recording medium on which the record dot has been formed is subjected to fixation. The fixation comprises heating the recording medium on which the record dot has been formed a temperature between temperatures of two major endothermic peaks by the differential scanning calorimetry. The heating can be effected with a heat source being in contact or non-contact with the recording medium. The heating is preferably effected with a heat roll or a heat plate being in contact with the recording medium, or by radiation heat with a flash lamp, an infrared heater, an oven, a halogen lamp, etc. In particular, it is preferable to heat the medium with a heat roll or a heat plate being in contact with the medium from the view point of a shorten fixing time and heat efficiency.

According to a further aspect of the present invention, there is provided an ink jet recording device suitable for the hot-melt ink composition according to the present invention.

The ink jet recording device according to the present invention will now be described with reference the accompanying drawings.

Figure 3:
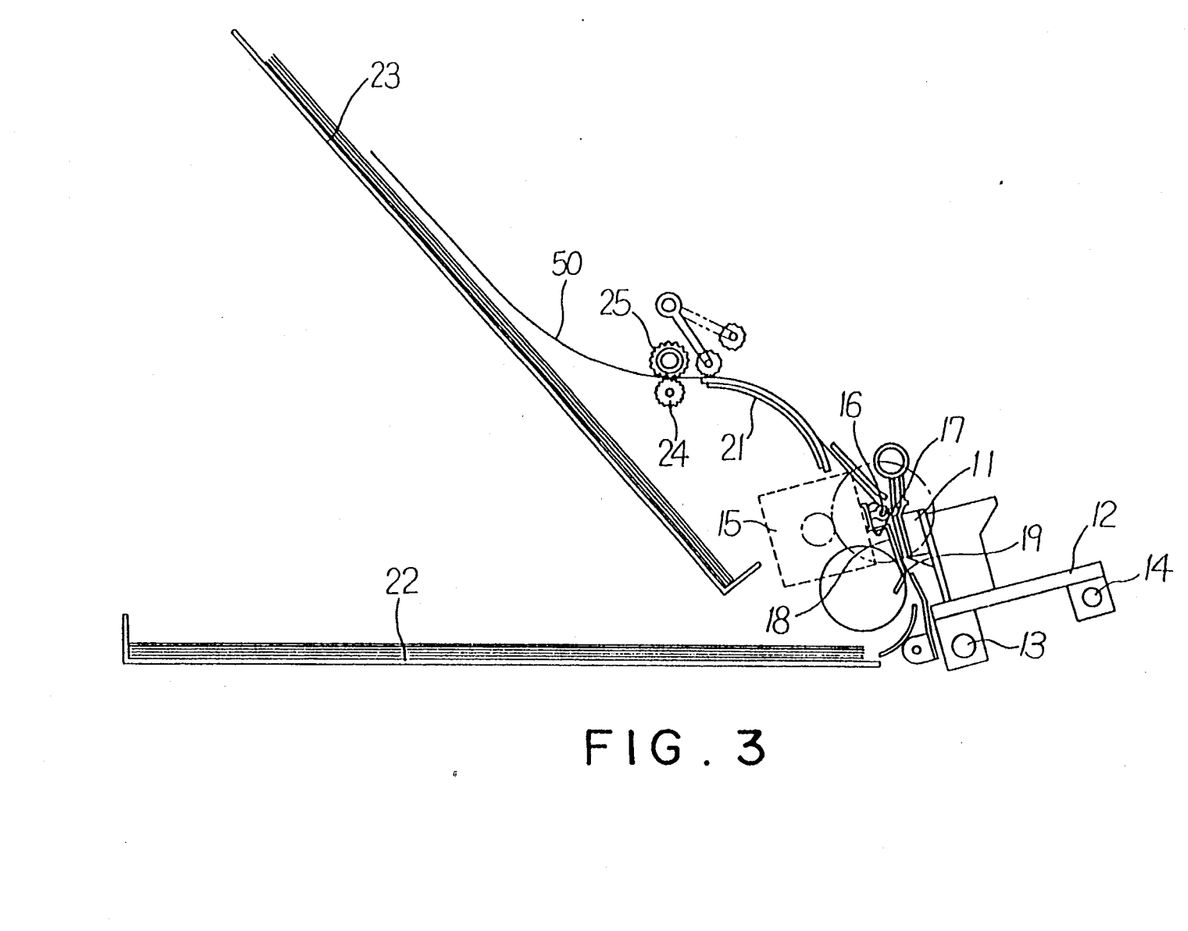
FIG. 3 is a schematic view of a preferred embodiment of the ink jet recording device according to the present invention.

FIG. 3 is a schematic diagram showing a preferred embodiment of the ink jet recording device according to the present invention. In FIG. 3, guide shafts 13 and 14 are fixed on a side frame (not shown) and serve to guide the movement of a carriage 12. The carriage 12 is constructed so as to be reciprocated by means of a carriage drive motor (not shown) in a main scanning direction parallel to a main roller 16. A recording head 11 is mounted on the carriage 12. The recording head 11 is provided with a heating means for heating the ink solid at room temperature and a plurality of nozzles capable of jetting a melted ink as droplets. The recording head 11 is scanned in a main scanning direction. Droplets are selectively jetted through the nozzle to form a dot image on a recording paper 50.

The recording paper 50 is carried from a paper feeding tray 22 by means of a separating roller (not shown) in a sub-scanning direction orthogonal to the main scanning direction. The recording paper 50 is carried through between a paper guide plate 19 and a platen 18 and is bitten by the main roller 16 and a coupled drive roller 17 for feeding paper. This causes the carriage of paper to be governed by the main roller 16. Then, other paper carrying force is released. The main roller 16 receives drive force from a paper feeding motor 15 and can always accurately carry the paper by one turn without occurrence of an error such as decentering.

The recording paper 50 on which a dot image has been formed and recorded is passed through a heating portion 21 and discharged into a delivery tray 23 by a star wheel 24 and a coupled drive roller 25 for delivery. The star wheel 24 is driven by means of a row of wheels (not shown) from a appear feed motor 15 at a rate slightly higher (for example, about 6% higher) than the main roller 16. The paper feeding force of the star wheel 24 and the coupled drive roller 25 for delivery is set at a slightly lower (for example, about 3 to 5% lower) than that of the appear feeding force of the main roller 16. These rollers are constructed so as to have no effect on the paper feeding accuracy. This construction enables the recording paper 50 to come into close contact with the heating portion 21.

The heating portion 21 is a convex plate. The heating portion 21 is provided with a heat source that can regulate the temperature in such a manner that the recording medium, on which a dot image has been formed, can be heated at a temperature between two major endothermic peak temperature of the ink composition by the differential scanning calorimetry.

In the above-described device, the temperature in the vicinity of the platen 18 located at a position facing the recording head is around room temperature. When ink droplets are jetted from the recording head 11, the ink droplets deposit on the recording paper 50 and immediately solidify. Thus, a good recording dot in a circular form is formed. Thereafter, the recording paper 50 is brought into contact with the heating portion 21. The contact of the recording paper 50 with the heating portion 21 causes the fixation to be initiated.

Figure 4:
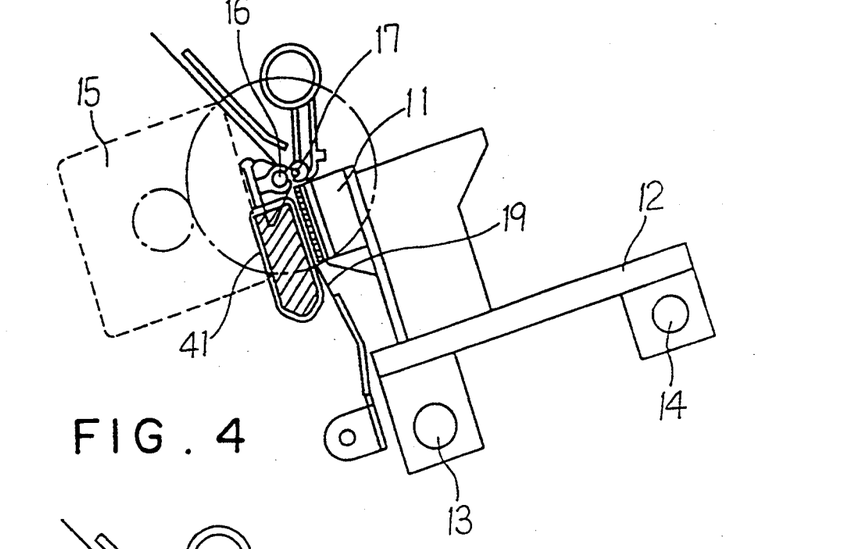
FIG. 4 is a diagram showing the ink jet recording device according to the present invention, wherein a cylindrical platen, through which cold air is passed, is provided at a portion facing a recording head.

When the temperature in the vicinity of the platen 18 located at a position facing the recording head exceeds room temperature due to heat generated by the device per se, it is preferred to cool the vicinity of the platen with a cooling fan as shown in FIG. 4. FIG. 4 is an enlarged view of the portion facing the recording head 11. In the drawing, the platen 41 is a cylindrical form into which air is fed by the cooling fan (not shown). The temperature in the vicinity of the platen 41 is regulated around room temperature by the feed of the air. It is preferred for the air fed to have a temperature below room temperature because the record dot can be formed at that temperature with a higher efficiency.

Figure 5:
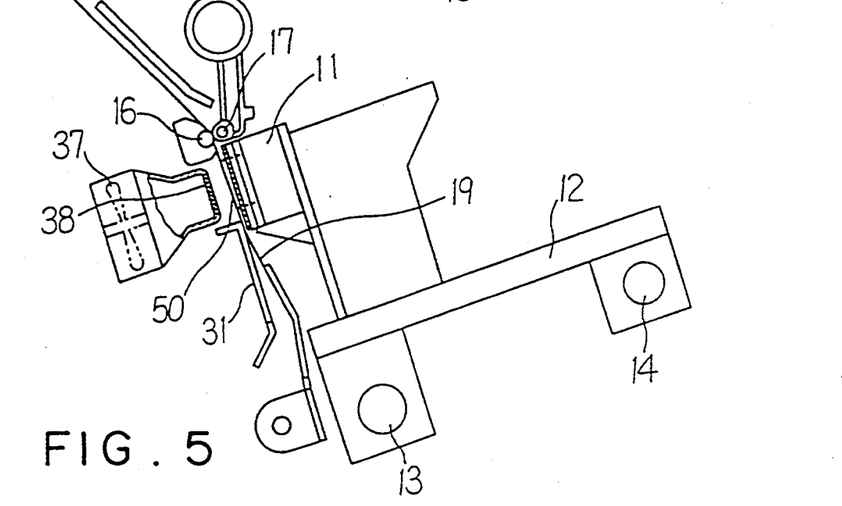
FIG. 5 is a diagram showing the ink jet recording device according to the present invention, wherein a cooler is provided at a portion facing a recording head.
Figure 6:
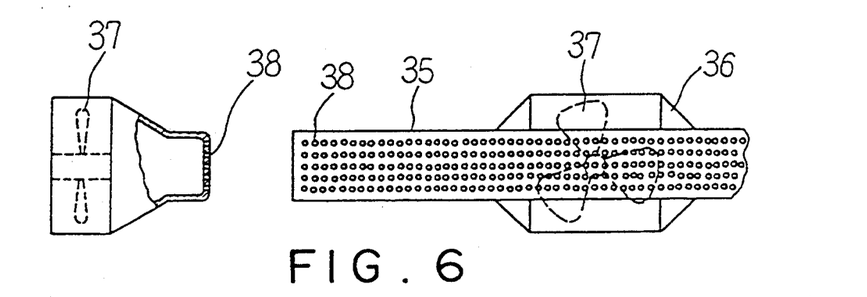
FIG. 6 is a schematic view of the cooler of the ink jet recording device shown in FIG. 5.

Furthermore, according to a preferred embodiment as shown in FIG. 5, the recording paper supported by a paper supporting plate 31 is directly cooled by the cooling fan without providing the platen at a position facing the recording head. FIG. 5 is an enlarged view of the portion facing the recording head 11. The portion facing the recording head 11 is provided with a cooler having a cooling fan 37 and air blowing holes 38 through which cold air is blown out. FIG. 6 is a schematic diagram of the cooler which comprises a cylinder 35 provided with air blowing holes 38 and a fan case 36 communicating with the cylinder and serving to accommodate the cooling fan 37. The cylinder 35 is placed in the main scanning direction. The cold air from the cooling fan 37 is blown out from the air blowing holes 38 through the cylinder 35, and directly blown against the back surface of the recording paper 50 to cool the recording paper 50.

Alternatively, a cooling fan may be provided so that the cold air is blown against the front surface of the recording paper to cool the recording paper.

EXAMPLES

The hot-melt ink composition according to the present invention will now be described in more detail with reference to the following Examples, though it is not limited to these Examples.

Hot-melt ink compositions having formulations specified in the following table were prepared as follows. The second component was heat-melted at a temperature about 10° to 20° C. above the melting point of the second component. A coloring material was added to the mixture. After the coloring material was fully dissolved in the second component, the first component was added thereto. The mixture was sufficiently stirred to provide a homogeneous composition. The composition was filtered by a filter to remove solid matter, thereby providing an ink composition.

In the table, Ex. 1 represents Example 1, and Comp. Ex. 1 represents Comparative Example 1.

The hot-melt ink compositions thus prepared were subjected to printing on common wood free paper, bond paper, PPC paper and sheets for OHP with an ink jet printer head for a hot-melt ink composition (manufactured by Seiko Epson Corporation). The recording paper subjected to printing was heated with a hot plate or a heat roller to a fixing temperature specified in the table to effect fixation.

The print samples thus obtained were subjected to the following evaluation tests. The results were as listed in the table.

Evaluation 1

Rubbing resistance of print

The printed face was rubbed with a clip under load to determine whether or not a stain of the print occurred. The maximum load under which no stain of the print occurred is given in the table.

Evaluation 2

Rubbing resistance of print on OHP sheet

The printed face of the OHP sheet was rubbed with a clip under a given load to determine whether or not a stain of the print occurred. The maximum load under which no stain of the print occurred is given in the table.

Evaluation 3

Blocking resistance of print

White recording paper was put on the printed face of the recording paper, a load of 6.2 g/cm$^2$ was applied to the top surface of the white paper. The assembly was allowed to stand at a temperature of 70° C. The load of 6.2 g/cm$^2$ corresponds to the case where 100 sheets of PPC paper were put on the print. The standing temperature, i.e., 70° C., was adopted on the assumption that the print was placed in a car. 24 hr after the assembly was allowed to stand under the conditions, observation was made on the blurring of the ink and the transfer of the ink to the paper put on the print. The print was evaluated based on the following criteria.

| | |
|---|---|
| Neither blur of ink nor transfer of ink observed | excellent (⊚) |
| Blur of ink or transfer of ink observed | poor (X) |

Evaluation 4

Blurring during fixation

The shape of dot after fixation was observed and evaluated based on the following criteria.

| | |
|---|---|
| No blur observed with sharp contour | excellent (⊚) |
| Blur observed with obscure contour | poor (X) |

Evaluation 5

Fixing time

The heating time taken for the above rubbing resistance to become at least a level evaluation as "excellent" was regarded as a fixing time.

In general, a fixing time of 5 sec or less is favorable, and a fixing time in the range of from 5 sec to 10 min is acceptable for practical use. On the other hand, a fixing time exceeding 10 sec is unfavorable from the practical viewpoint.

Evaluation 6

Service life of ink

The ink composition was sealed into a glass vessel and allowed to stand in a constant temperature bath of 130° C. to determine the service life of ink that can be defined as a time taken for unfavorable phenomena such as occurrence of precipitates, disappearance of compatibility of ink (occurrence of layer separation) and a change in properties of the ink, to occur and to hinder ink jet recording.

In general, a service life exceeding 200 hr is favorable, and a service life in the range of from 100 to 200 hr is acceptable for practical use. On the other hand, a fixing time shorter than 100 hr is unfavorable from the practical viewpoint.

Evaluation 7

Fixing temperature margin

The difference in the melting point between the first component and the second component was regarded as the fixing temperature margin. In general, a margin of 20° C. or above is favorable, and a margin in the range of from 10° to 20° C. exclusive is acceptable for practical use. On the other hand, a margin below 10° C. is not very favorable.

Evaluation 8

Melting completion temperature

The melting point of the ink composition was measured by DSC. The temperature of the endothermic peak originated from the second component was regarded as the melting completion temperature.

In general, a lower melting completion temperature is favorable because the jetting temperature and melt holing temperature can be lowered. This is preferred also from the viewpoint of preventing the deterioration of the ink composition at a high temperature. In general, it is said that a 10° C. increase in the temperature causes the influence of the temperature on the deterioration of the ink to be doubled.

TABLE 1

| | Com. Ex. 1 | Ex. 1 | Ex. 2 | Ex. 3 | Ex. 4 | Ex. 5 | Ex. 6 | Ex. 7 |
|---|---|---|---|---|---|---|---|---|
| 1st-component (E1) | | | | | | | | |
| HNP-3 | 95.0 | | 92.5 | 92.5 | | 92.0 | | 69.0 |
| HNP-10 | | | | | | | | |
| No. 115 | | 93.0 | | | | | 92.0 | |
| hydrogenated jojoba | | | | | 92.5 | | | 23.0 |
| Carnauba | | | | | | | | |
| Candelilla | | | | | | | | |
| 2nd-component (E2) | | | | | | | | |
| Stearic acid amide | | 7.0 | | 7.5 | 3.0 | 8.0 | 8.0 | |
| Behenic acid amide | 5.0 | | 7.5 | | 4.5 | | | 8.0 |
| Palmitic acid amide | | | | | | | | |
| Resin | | | | | | | | |
| Super Ester | | | | | | | | |
| Arkon P-70 | | | | | | | | |
| Quintone | | | | | | | | |
| Oligotech 1100 | | | | | | | | |
| Dye (D1) | | | | | | | | |
| Spilon Black GMH | 1.5 | | 3.0 | 3.0 | 4.0 | | | 3.0 |
| Spilon Y C-GNH | 0.2 | 3.0 | 0.3 | 0.3 | | | 3.0 | 0.3 |
| VALIFAST Pink | | | | | | | | |
| OIL Blue | | | | 2.0 | | | | |
| E1:E2 | 95:5 | 93:7 | 92.5:7.5 | ← | ← | 92:8 | ← | ← |
| D1:E2 | 0.34 | 0.43 | 0.44 | 0.26 | 0.44 | 0.50 | 0.375 | 0.4125 |
| Fixing temp. (°C.) | 85 | 75 | 85 | 80 | 75 | 80 | 75 | 80 |
| Rubbing Resistance | 150 g | 200 g | 200 g | 150 g | 250 g | 200 g | 200 g | 250 g |
| OHP rubbing Resistance | | | | | | | | |
| Blocking | ⊙ | ⊙ | ⊙ | ⊙ | ⊙ | ⊙ | ⊙ | ⊙ |
| Blurring in fixation | × | ⊙ | ⊙ | ⊙ | ⊙ | ⊙ | ⊙ | ⊙ |
| Fixing time (sec) | ≦5 | ≦5 | ≦5 | 5~10 | | ≦5 | ≦5 | |
| Service life (hr) | ≦100 | 100–200 | 100–200 | | | ≦100 | | |
| Fixing margin (°C.) | | | | | | ≦10 | ≦10 | 20≦ |
| Melting completion temp.(°C.) | | 105 | | | 95 | | | |

| | Ex. 8 | Ex. 9 | Ex. 10 | Ex. 11 | Ex. 12 | Ex. 13 | Ex. 14 | Ex. 15 |
|---|---|---|---|---|---|---|---|---|
| 1st-component (E1) | | | | | | | | |
| HNP-3 | | | | | 67.5 | 45.0 | | |
| HNP-10 | | 91.0 | | 90.0 | | | 67.5 | |
| No. 115 | 92.0 | | 40.0 | | | | 22.5 | 90.0 |
| hydrogenated jojoba | | | | | 22.5 | 45.0 | | |
| Carnauba | | | | | | | | |
| Candelilla | | | 50.0 | | | | | |
| 2nd-component (E2) | | | | | | | | |
| Stearic acid amide | | | | | | | 10.0 | |
| Behenic acid amide | | 9.0 | | 10.0 | 10.0 | 10.0 | | |
| Palmitic acid amide | 8.0 | | 10.0 | | | | | 10.0 |
| Resin | | | | | | | | |
| Super Ester | | | | | | | | |
| Arkon P-70 | | | | | | | | |
| Quintone | | | | | | | | |
| Oligotech 1100 | | | | | | | | |
| Dye (D1) | | | | | | | | |
| Spilon Black GMH | | | | 3.0 | 3.0 | 3.0 | | |
| Spilon Y C-GNH | | | | 0.3 | 0.3 | 0.3 | 3.0 | |
| VALIFAST Pink | 2.5 | | 5.0 | | | | | |
| OIL Blue | | 3.0 | | | | | | 2.0 |
| E1:E2 | ← | 91:9 | 90:10 | ← | ← | ← | ← | ← |
| D1:E2 | 0.3125 | 0.22 | 0.50 | 0.33 | 0.33 | 0.33 | 0.30 | 0.20 |
| Fixing temp. (°C.) | 70 | 85 | 70 | 85 | 80 | 80 | 75 | 70 |

TABLE 1-continued

| | | | | | | | | |
|---|---|---|---|---|---|---|---|---|
| Rubbing Resistance | 150 g | 150 g | 250 g | 200 g | 250 g | 250 g | 250 g | 150 g |
| OHP rubbing Resistance | | | | | | | | |
| Blocking | ⊚ | ⊚ | ⊚ | ⊚ | ⊚ | ⊚ | ⊚ | ⊚ |
| Blurring in fixation | ⊚ | ⊚ | ⊚ | ⊚ | ⊚ | ⊚ | ⊚ | ⊚ |
| Fixing time (sec) | ≦5 | 5~10 | | ≦5 | | | | 5~10 |
| Service life (hr) | | | ≦100 | 200≦ | | | | 200≦ |
| Fixing margin (°C.) | | | 20≦ | ≦10 | 20≦ | 10-20 | 20≦ | |
| Melting completion temp.(°C.) | | | | | | | | |

| | Com. Ex. 2 | Com. Ex. 3 | Ex. 24 | Ex. 25 | Com. Ex. 4 | Ex. 26 | Ex. 27 | Ex. 28 |
|---|---|---|---|---|---|---|---|---|
| 1st-component (E1) | | | | | | | | |
| HNP-3 | 85.0 | 85.0 | | | | 50.0 | | 75.0 |
| HNP-10 | | | | 80.0 | | | 80.0 | |
| No. 115 | | | 85.0 | | 80.0 | | | |
| hydrogenated jojoba | | | | | | 30.0 | | |
| Carnauba | | | | | | | | |
| Candelilla | | | | | | | | |
| 2nd-component (E2) | | | | | | | | |
| Stearic acid amide | 15.0 | 15.0 | 10.0 | | | | 10.0 | 25.0 |
| Behenic acid amide | | | 5.0 | 20.0 | | 20.0 | 10.0 | |
| Palmitic acid amide | | | | | 20.0 | | | |
| Resin | | | | | | | | |
| Super Ester | | | | | | | | |
| Arkon P-70 | | | | | | | | |
| Quintone | | | | | | | | |
| Oligotech 1100 | | | | | | | | |
| Dye (D1) | | | | | | | | |
| Spilon Black GMH | 4.0 | 3.0 | | | 3.0 | | | |
| Spilon Y C-GNH | | | | | | | | |
| VALIFAST Pink | | | | 5.0 | | | | |
| OIL Blue | | | | 6.0 | | 6.0 | 6.0 | 7.5 |
| E1:E2 | ← | ← | ← | 80:20 | ← | ← | ← | 75:25 |
| D1:E2 | 0.267 | 0.20 | 0.33 | 0.30 | 0.15 | 0.30 | 0.30 | 0.30 |
| Fixing temp. (°C.) | 80 | 80 | 65 | 85 | 60 | 80 | 80 | 80 |
| Rubbing Resistance | 100 g | 75 g | 150 g | 75 g | 75 g | 150 g | 150 g | 50 g |
| OHP rubbing Resistance | ≦100 g | | | | | | | |
| Blocking | ⊚ | ⊚ | ⊚ | ⊚ | ⊚ | ⊚ | ⊚ | ⊚ |
| Blurring in fixation | × | × | ⊚ | ⊚ | × | ⊚ | ⊚ | ⊚ |
| Fixing time (sec) | 5-10 | 5-10 | | ≦5 | 10≦ | | | ≦5 |
| Service life (hr) | | | | | | | | |
| Fixing margin (°C.) | | | | ≦10 | | 20≦ | | |
| Melting completion temp.(°C.) | | | 93 | 110 | 105 | | 95 | |

| | Ex. 16 | Ex. 17 | Ex. 18 | Ex. 19 | Ex. 20 | Ex. 21 | Ex. 22 | Ex. 23 |
|---|---|---|---|---|---|---|---|---|
| 1st-component (E1) | | | | | | | | |
| HNP-3 | 90.0 | | | 90.0 | 67.5 | | | |
| HNP-10 | | 90.0 | 45.0 | | | 67.5 | | |
| No. 115 | | | | | | 22.5 | 85.0 | 85.0 |
| hydrogenated jojoba | | | | | 22.5 | | | |
| Carnauba | | | 45.0 | | | | | |
| Candelilla | | | | | | | | |
| 2nd-component (E2) | | | | | | | | |
| Stearic acid amide | | 10.0 | | | | 2.5 | | |
| Behenic acid amide | 10.0 | | | 5.0 | 5.0 | 7.5 | | |
| Palmitic acid amide | | | 10.0 | 5.0 | 5.0 | | 15.0 | 15.0 |
| Resin | | | | | | | | |
| Super Ester | | | | | | | | |
| Arkon P-70 | | | | | | | | |
| Quintone | | | | | | | | |
| Oligotech 1100 | | | | | | | | |
| Dye (D1) | | | | | | | | |
| Spilon Black GMH | 2.0 | | | 3.0 | 3.0 | | 7.0 | |
| Spilon Y C-GNH | | | | 0.3 | 0.3 | 3.0 | | |
| VALIFAST Pink | | | | | | | | 5.0 |
| OIL Blue | | 2.0 | 2.0 | | | | | |
| E1:E2 | ← | ← | ← | ← | ← | ← | 85:15 | ← |
| D1:E2 | 0.20 | 0.20 | 0.20 | 0.33 | 0.33 | 0.30 | 0.467 | 0.333 |
| Fixing temp. (°C.) | 85 | 80 | 75 | 80 | 75 | 80 | 70 | 70 |
| Rubbing Resistance | <150 g | <150 g | 200 g | 200 g | 200 g | 200 g | 100 g | 100 g |
| OHP rubbing Resistance | | ≦100 g | | | | | | |
| Blocking | ⊚ | ⊚ | ⊚ | ⊚ | ⊚ | ⊚ | ⊚ | ⊚ |
| Blurring in fixation | ⊚ | ⊚ | ⊚ | ⊚ | ⊚ | ⊚ | ⊚ | ⊚ |
| Fixing time (sec) | 5~10 | 5~10 | 5~10 | | | | ≦50 | ≦5 |
| Service life (hr) | | | | | | | ≦100 | 200≦ |
| Fixing margin (°C.) | 10-20 | ≦10 | 10-20 | | | | | |
| Melting completion temp.(°C.) | 110 | | | 90 | 90 | 95 | 105 | 105 |

| | Ex. 29 | Com. Ex. 5 | Ex. 30 | Ex. 31 | Ex. 32 | Ex. 33 | Ex. 34 | Ex. 35 | Com. Ex. 6 |
|---|---|---|---|---|---|---|---|---|---|
| 1st-component (E1) | | | | | | | | | |
| HNP-3 | 50.0 | | | 45.0 | | 62.5 | 80.0 | | 40.0 |

TABLE 1-continued

| | | | | | | | | | |
|---|---|---|---|---|---|---|---|---|---|
| HNP-10 | | | 85.0 | | | | | | |
| No. 115 | | 30.0 | | | | | | | |
| hydrogenated jojoba | | | | 70.0 | 17.5 | | 70.0 | | |
| Carnauba | | | | | | | | | |
| Candelilla | | | | | | | | | |
| 2nd-component (E2) | | | | | | | | | |
| Stearic acid amide | | 55.0 | | 10.0 | | | | | 10.0 |
| Behenic acid amide | 50.0 | | 10.0 | | 15.0 | 10.0 | 5.0 | 15.0 | |
| Palmitic acid amide | | | | | | 5.0 | | | |
| Resin | | | | | | | | | |
| Super Ester | | | 5.0 | | 15.0 | | | | |
| Arkon P-70 | | | | 45.0 | | 10.0 | | | 50.0 |
| Quintone | | | | | | | 10.0 | | |
| Oligotech 1100 | | | | | | | | 15.0 | |
| Dye (D1) | | | | | | | | | |
| Spilon Black GMH | 15.0 | 15.0 | 3.0 | 3.0 | | | 3.0 | | 3.0 |
| Spilon Y C-GNH | 1.5 | | 0.3 | 0.3 | | | | 4.0 | 0.3 |
| VALIFAST Pink | | | | | 4.0 | | | | |
| OIL Blue | | | | | | 3.0 | | | |
| E1:E2 | 50:50 | 30:55 | | | | | | | |
| D1:E2 | 0.33 | 0.273 | 0.33 | 0.33 | 0.27 | 0.30 | 0.30 | 0.27 | 0.33 |
| Fixing temp. (°C.) | 85 | 70 | 85 | 75 | 80 | 80 | 80 | 80 | |
| Rubbing Resistance | 50 g | ≦50 g | 250 g | 250 g | 250 g | 250 g | 250 g | 250 g | * |
| OHP rubbing Resistance | | | 150 g | 200 g | 150 g | 200 g | 200 g | 200 g | |
| Blocking | ⊙ | ⊙ | ⊙ | ⊙ | ⊙ | ⊙ | ⊙ | ⊙ | |
| Blurring in fixation | ⊙ | × | ⊙ | ⊙ | ⊙ | ⊙ | ⊙ | ⊙ | |
| Fixing time (sec) | ≦5 | 5–10 | | | | | | | |
| Service life (hr) | ≦200 | | | | | | | | |
| Fixing margin (°C.) | | | | | | | | | |
| Melting completion temp.(°C.) | | | | | | | | | |

*not printable

What is claimed is:

1. A hot-melt ink composition comprising:
   a coloring material;
   a vehicle comprising at least a first component and a second component; and
   a resin selected from the group consisting of rosins, rosin derivatives, terpenes, modified terpenes, aliphatic petroleum resins, aromatic petroleum resins, hydrogenated and copolymer petroleum resins, cumarone-indene resins, styrene resins, polyamide resins, polyethylene resins and polyethylene copolymers,
   wherein said first component, by itself, does not dissolve said coloring material,
   said second component has a higher melting point than said first component, dissolves said coloring material, is compatible with said first component at the melting point of said second component or above, and can dissolve said coloring material and said first component to form a homogeneous phase, and
   said resin is compatible with either one or both of said first component and said second component.

2. A hot-melt ink composition according to claim 1, wherein the first and second components are selected such that the composition has at least two major endothermic peaks as obtained by differential scanning calorimetry, with the difference between temperatures at which the peaks appear being 10° C. or above.

3. A hot-melt ink composition according to claim 1, wherein the coloring material is present in said composition with respect to said second component in a weight ratio of 0.45 or less.

4. A hot-melt ink composition according to claim 1, wherein said coloring material comprises a dye.

5. A hot-melt ink composition according to claim 1, wherein said first component comprises a petroleum wax, a vegetable wax or a mixture of a petroleum wax with a vegetable wax.

6. A hot-melt ink composition according to claim 5, wherein said petroleum wax is paraffin wax.

7. A hot-melt ink composition according to claim 5, wherein said vegetable wax is selected from the group consisting of carnauba wax, candelilla wax and hydrogenated jojoba oil.

8. A hot-melt ink composition according to claim 1, wherein said second component is selected from the group consisting of fatty acids, fatty acid amides, and derivatives thereof.

9. A hot-melt ink composition according to claim 8, wherein said second component comprises a mixture of two or more fatty acid amides.

10. A hot-melt ink composition according to claim 9, wherein at least one of said fatty acid amides is selected from the group consisting of behenic amide, stearic amide and palmitic amide.

11. A hot-melt ink composition according to claim 1, containing 5 to 45% by weight of said resin.

12. An ink jet recording method comprising the steps of:
   heating a hot-melt ink composition according to claim 1 at a temperature above the melting point of said second component; said hot-melt ink composition exhibiting at least two major peaks in differential scanning calorimetry, said two major endothermic peaks comprising a first endothermic peak at a first temperature and a second endothermic peak at a second temperature which is higher than the first temperature;
   jetting the heated hot-melt ink composition as droplets on a recording medium;
   solidifying the ink droplets on said recording medium; and
   heating said recording medium at a temperature between said first and second temperatures, thereby to cause only said first component to selectively melt-penetrate into the recording medium while leaving said second component and said coloring material on the recording medium.

13. A hot-melt ink composition according to claim 1, wherein the first component has a melting point that is different from that of the second component by 10° C. or more.

14. A hot-melt ink composition according to claim 1, wherein the first component has a melting point that is different from that of the second component by 20° C. or more.

15. An ink jet recording device wherein an ink composition, which is solid at room temperature, is jetted as droplets at a temperature above room temperature on a recording medium to effect printing, said ink jet recording device comprising:

heating means for heating the ink composition to a temperature above room temperature to bring the ink composition into a melted state, said ink composition comprising two vehicle components having different melting points such that the ink composition exhibits two major endothermic peaks in differential scanning calorimetry, said two major endothermic peaks comprising a first endothermic peak at a first temperature and a second endothermic peak at a second temperature which is higher than the first temperature;

recording means for jetting the ink composition in the melted state through an ink jetting port to form a dot image on said recording medium;

a cooling area facing said recording means for cooling the recording medium having the dot image formed thereon to room temperature or below;

heat-fixing means for heating the recording medium at a temperature between said first and second temperatures;

and carrying means for carrying recording medium cooled in said cooling area to said heat-fixing means.

16. A method for ink jet recording with a hot-melt ink composition which is solid at room temperature and comprises two vehicle components having different melting points, said ink composition exhibiting at least two major endothermic peaks in differential scanning calorimetry, with said at least two major peaks comprising a first peak at a first temperature and a second peak at a second temperature which is higher than the first temperature, said method comprising the steps of:

jetting the heated hot-melt ink composition as droplets on a recording medium;

cooling the recording medium to room temperature or below; and heating said recording medium at a temperature between said first and second temperatures.

17. An ink jet recording device as claimed in claim 15 wherein the cooling area comprises a cooling fan.

18. A hot-melt ink composition comprising:

a) a coloring material;

b) a vehicle comprising at least a first component which cannot by itself dissolve the coloring material and a second component, said second component having a higher melting point than said first component, being capable of dissolving said coloring material and being compatible with said first component at the melting point of said second component or above, said coloring material and said first component being dissolved with second component to form a homogeneous phase, said first and second components and coloring material being present in said composition in amounts sufficient to render the composition suitable for forming print having a certain rubbing resistance on a recording medium; and c) a resin selected from the group consisting of rosins, rosin derivatives, terpenes, modified terpenes, aliphatic petroleum resins, aromatic petroleum resins, hydrogenated and copolymer petroleum resins, cumarone-indene resins, styrene resins, polyamide resins, polyethylene resins and polyethylene copolymers compatible with either one or both of said first component and said second component and being present in said composition in an amount sufficient to improve the rubbing resistance of the print.

* * * * *